June 17, 1969   W. E. GOOD ET AL   3,450,462
COLOR PROJECTION SYSTEM
Filed July 24, 1964   Sheet 3 of 5

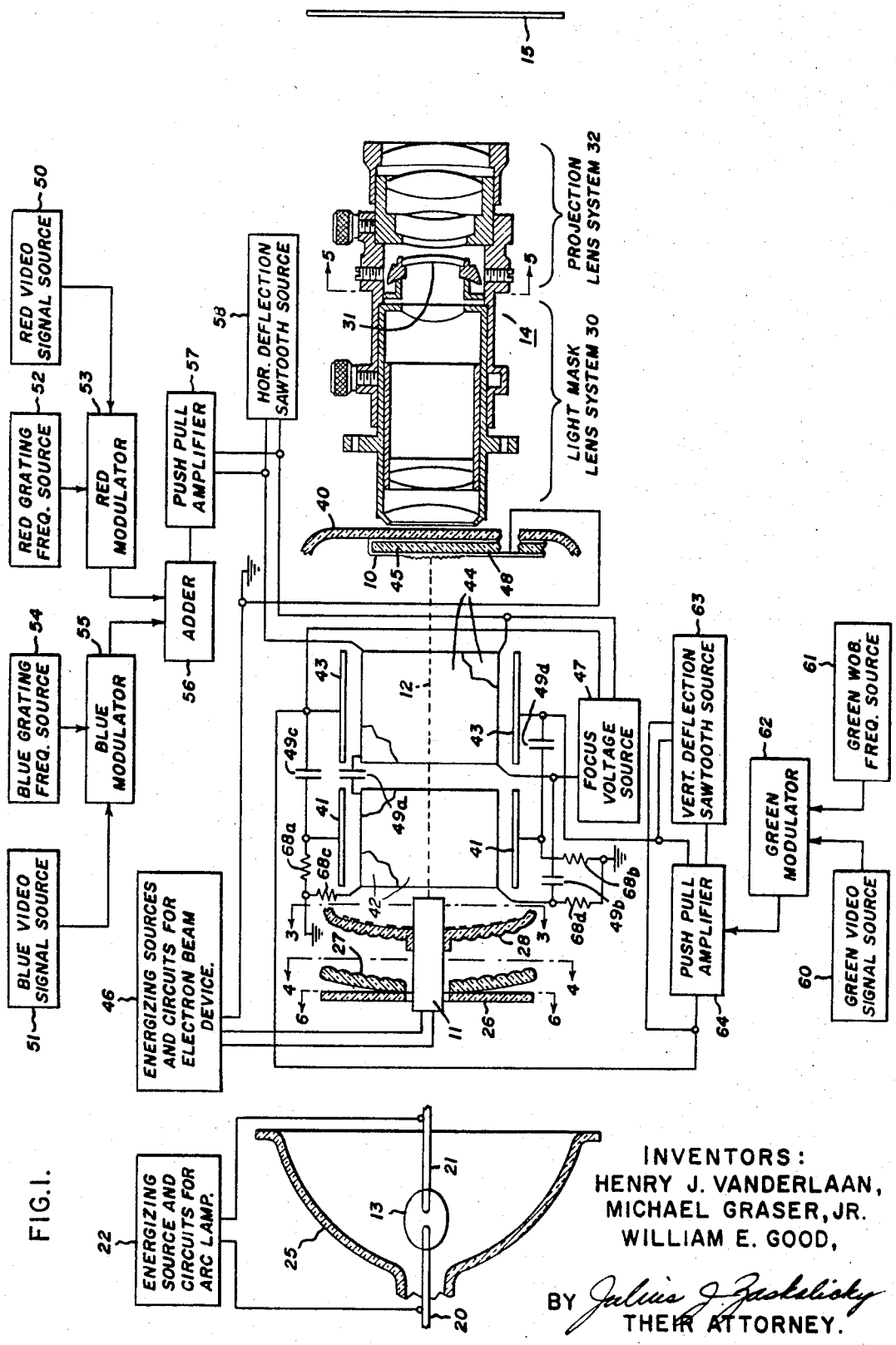

INVENTORS:
HENRY J. VANDERLAAN,
MICHAEL GRASER, JR.
WILLIAM E. GOOD,

BY *Julius J. Zaskalicky*
THEIR ATTORNEY.

INVENTORS:
HENRY J. VANDERLAAN,
MICHAEL GRASER, JR.
WILLIAM E. GOOD,

BY *Julius J. Zaskalicky*
THEIR ATTORNEY.

INVENTORS:
HENRY J. VANDERLAAN,
MICHAEL GRASER, JR,
WILLIAM E. GOOD,

BY *Julius J. Zaskalicky*
THEIR ATTORNEY.

United States Patent Office 3,450,462
Patented June 17, 1969

3,450,462
COLOR PROJECTION SYSTEM
William E. Good, Liverpool, Michael Graser, Jr., Fayetteville, and Henry J. Vanderlaan, Liverpool, N.Y., assignors to General Electric Company, a corporation of New York
Filed July 24, 1964, Ser. No. 384,955
Int. Cl. G02f 1/28; H04n 5/38, 5/44
U.S. Cl. 350—161                                       1 Claim

ABSTRACT OF THE DISCLOSURE

Light valve projection apparatus in which a pair of light masks, each having one area of transparent slots and opaque bars and another area of transparent slots and opaque bars, is disposed on each side of a fluid medium deformable by a scanning electron beam into light diffraction gratings. The masks and the diffraction gratings of the medium coact to modulate light from a projector system so that images resulting from the electron beam scanning are projected onto a display screen. A filter is provided in the light projection path having one area of one light transmission characteristic and another area of another light transmission characteristic registering with the one area and the other area, respectively, of the masks.

---

The present invention relates to improvements in systems for the projection of images of the kind including a light modulating medium in which diffraction gratings are formed by electron charge deposited thereon in accordance with electrical signals corresponding to the images.

In particular, the invention relates to the projection of color images using a common area of the light modulating medium and a common electron beam to produce deformations in the medium for simultaneously controlling the transmission therethrough point by point of the primary color components, in kind and intensity, in a beam of light in response to a plurality of simultaneously occurring electrical signals, each deformation corresponding point by point to the intensity of a respective primary color component of an image to be projected by such beam of light. Such systems provide a number of advantages over conventional systems in which the resultant light output is dependent on the energy in an electron beam and is a small fraction of such limited energy available in an electron beam.

One such system for controlling the intensity of a beam of light includes a viscous light modulating medium which is adapted to deviate each portion of the beam in accordance with deformations in a respective point thereof on which the portion is incident, and a light mask having a plurality of apertures therein disposed to mask the beam of light in the absence of any deformation in the light modulating medium and to pass light in accordance with the deformations in said medium. The intensity of the portions of the beam of light deviated by the light modulating medium and passed through the apertures of the light mask varies in accordance with the magnitude of deformations produced in the light modulating medium.

The light modulating medium may be a thin light transmissive layer of oil in which the electron beam forms phase diffraction gratings having adjacent valleys apart by a predetermined distance. Each portion of light incident on a respective small area or point of the medium is deviated in a direction orthogonal to the direction of the valleys. The intensity of the deviated light is a function of the depth of the valleys.

The phase diffraction grating may be formed in the layer of oil by the deposition thereon of electrical charges, for example, by a beam of electrons. The beam may be directed on the medium and deflected along the surface thereof in one direction at successively spaced intervals perpendicular or orthogonal to the one direction. Concurrently the rate of deflection in the one direction may be altered periodically at a frequency considerably higher than the frequency of scan to produce alterations in the electrical charges deposited on the medium along the direction of scan. The concentrations of electrical charge in corresponding parts of each line of scan form lines of electrical charge which are attracted to a suitably disposed oppositely charged transparent conducting plate on the other surface of the layer thereby producing a series of valleys therein. As the periodic variations in the period of scan are changed in amplitude, the depth of the valleys are correspondingly changed. Thus, with such a means each element of a beam of light impinging on one of the opposite surfaces of the layer is deflected orthogonally to the direction of the valleys or lines therein by an amount determined by the spacing between adjacent valleys, and the intensity of an element of deflected light is a function of the depth of such valleys.

When a beam of white light, which is constituted of primary color components of light, is directed on a diffraction grating, light impinging therefrom is dispersed into a series of spectra on each side of a line representing the direction or path of undeviated light. The first pair of spectra on each side of the undeviated path of light is referred to as first order diffraction pattern. The next pair of spectra on each side of the undiffracted path is referred to as second order diffraction pattern, and so on. In each order of the complete spectrum the blue light is deviated the least, and the red light the most. The angle of deviation of red light in the first order light pattern, for example, is that angle measured with reference to the undeviated path at which the ratio of the wavelength of red light to the line to line spacings of the grating is equal to the sine of the deviation angle. The angle of deviation of the red light in the second order pattern is that angle at which the ratio of twice the wavelength of red light to the line to line spacing of the grating is equal to the sine of the angle, and so on.

If a beam of light is oblong in shape, each of the spectra is constituted of color components which are oblong in shape. If the diffracted light is directed onto a mask having a wide transparent slot appropriately located on the mask, the light passed through the slots is essentially reconstituted white light, each portion of which is of an intensity corresponding to the depth of the valleys illuminated by such portion. Such a system as described would be suitable for the projection of television images in black and white. The line to line spacing of the grating formed in each part of the light modulating medium is the same and determines the deviation of light under conditions of modulation. The depth of the valleys formed in each part of the light modulating medium varies in accordance with the amplitude of the modulating signal and determines the intensity of light in each deviated portion of the beam.

Systems have been proposed for the projection of three primary colors by a common viscous light modulating medium in which light deviating deformations are produced therein by a common electron beam modulated in various ways to produce a set of three diffraction gratings on the common media, each corresponding to a respective primary color component. The line to line spacing of each of the diffraction gratings are different thus producing a different angle of deviation for each of the primary color components. The depth of the deformation is varied in accordance with a respective primary color signal to produce corresponding variations in the intensity of light passed by the color pencil. The apertures in a light output mask are of predetermined extent and at locations in order to selectively pass the primary color components of the diffraction spectrum. The line to line spacing of each of the three primary diffraction gratings determines the width and location of the cooperating slot to pass the respective primary color components when a diffraction grating corresponding to that color component is formed in the light modulating medium.

In the kind of system under consideration an electron beam is modulated by a plurality of carrier waves of fixed and different frequency each corresponding to a respective color component, the amplitude of each of which is modulated in accordance with an electrical signal corresponding to the intensity of the respective color component to form a plurality of diffraction gratings having valleys extending in the same direction, each grating having a different line to line spacing corresponding to a respective primary color component and the valleys thereof having an amplitude varying in accordance with the intensity of a respective primary color component. If the primary color components selected are blue, green and red, and the carrier frequency associated with each of these colors is proportionately lower, the deviation in the first order spectrum of the blue component of white light by the blue diffraction grating, and similarly the deviation of the green component by the green diffraction grating, and the deviation of the red component by the red diffraction grating, can be made to correspond quite closely. Accordingly, a pair of transparent slots placed in the light mask in position, relative to the undeviated path of light, corresponding to that deviation and of just sufficient orthogonal extent, pass all of the primary components. The intensity of each of the primary color components in the beam of light emerging from the mask would vary in accordance with the amplitude of a respective electrical signal corresponding to the respective color component. Projection of such a beam reconstitutes in color the image corresponding to the electrical signals.

When three diffraction gratings are formed simultaneously on a common area of the light modulating medium each having lines extending in the same direction beat gratings are produced which have an adverse effect on the efficiencies of the color channel of the system and also upon the purity of primary color light passed by each of the channels whereby the reproduction of the color image is deleteriously affected. Such adverse effects are in large partly eliminated in a system in which one of the diffraction gratings has lines orthogonal to the direction of the other two diffraction gratings and in which the output light mask has corresponding orthogonally arranged transparent slots of particular portions. Such systems are described and claimed in U.S. Patent 3,078,338, W. E. Glenn, Jr., and a copending patent application Ser. No. 343,990, filed Feb. 11, 1964, both assigned to the assignee of the present invention. Preferably, in the latter described system the one grating lines correspond in direction to the direction of horizontal scan, and the line to line spacing corresponds to the line to line spacing in a field of scan. Of course, the lines of the other diffraction gratings would be perpendicular or orthogonal to the lines of the one grating. In such a system it has been found advantageous to form the gratings corresponding to the red and blue primary color components with lines orthogonal to the direction of horizontal scan and to utilize the grating formed by the lines of horizontal scan for control of the green color component in the image.

In such a system there is provided a source of white light or light containing the various primary colors and an input light mask having two groups of slots orthogonally arranged with respect to the other in the light mask and each corresponding to a respective group of slots in an output mask. Light from the source is imaged through the slots of the input mask onto the light modulating medium by an appropriate light condensing system and a lens system is provided for imaging the slots of light emerging from the input mask onto corresponding opaque bars or regions in the output mask in the absence of any deformations in the light modulating medium.

In such a system the efficient utilization of light developed by the source of light is important in order to reduce the size of the source necessary for projection of an image of desired intensity and also for elimination of dissipation of energy in the various elements which may give rise to undesired heating effects. Efficient utilization of light is particularly important in the portions of the apparatus in which high light level appears, namely, the projection of the light from the source onto the light modulating medium. An efficient system of such character is described and claimed in U.S. Patent 3,330,908 Ser. No. 316,606, filed Oct. 16, 1963, and assigned to the assignee of the present invention.

A system such as described in the preceding two paragraphs presents in practical execution such problems as disposition and orientation of the groups of slots in the input and output mask for maximum efficiency, minimum grating compression in the dual color channel for color selection and minimum cross contamination of colors, and orientation of slots in the dual channel so as to be relatively insensitive to cross contamination of colors due to chromatic aberrations of the mask lens system.

In a system such as described above utilizing orthogonally directed gratings and cooperating input light masks having corresponding directed transparent slots, color selection must be provided either prior to the light from the source impinging on the mask or subsequent to the light emerging from the light modulating medium. In prior art systems filters are provided to accomplish this purpose. In some systems which provide filters in the input to the light modulating medium a dichroic arrangement is utilized in which the filter passes light of one primary color and reflects light of the other two colors, the latter light being in turn redirected into the other two color channels of the system for making maximum use of the light from the source. Such an arrangement is described for example in U.S. Patent 3,118,969, W. E. Glenn, Jr., assigned to the assignee of the present invention. While such an arrangement permits efficient utilization of the light available in a light source it is limited even with ideally designed filter, i.e., block filters, in its capability of providing in the three color channels independently selectable or controllable dominant wavelengths of the three primary colors and the purity thereof which is essential for faithful rendition of color images.

The present invention is directed to providing an improved system of light projection in which the shortcomings, such as enumerated above with regard to independently selected wavelengths of desired purity with minimal sacrifice of overall light efficiency, as well as others to be described below.

Accordingly, it is an object of the present invention to provide a color projection system which makes efficient utilization of light from a light source.

Another object of the present invention is to provide a color projection system in which the dominant wavelengths of the primary colors are independently selectably derived from a source of light containing such components and which purity thereof is independently controllable.

It is another object of the present invention to provide a color projection system of simplified construction using a minimum of parts yet which provides efficient utilization of light from a source, effective separation of light from such source into primary color light of desired purity for utilization in the system for projection of faithful color images.

It is a further object of the present invention to provide a color projection system in which color contamination of the various primary color channels and vignetting is minimized.

The novel features believed characteristic of the invention are set forth in the appended claims. The invention itself, together with further objects and advantages thereof, may best be understood by reference to the following description taken in connection with the accompanying drawings in which:

FIGURE 1 is a schematic diagram of the optical and electrical elements of a system useful in explaining the present invention.

Figure 2A:
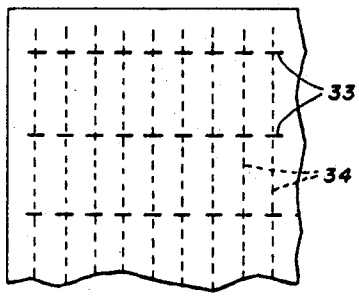
FIGURES 2A through 2F are diagrammatic representations of the active area of the light modulating medium showing the horizontal scan lines and the location of charge with respect thereto for the various primary color channels of the system.

Referring now to FIGURE 1 there is shown a simultaneous color projection system comprising an optical channel including a light modulating medium 10, and an electrical channel including an electron beam device 11, the electron beam 12 of which is coupled to the light modulating medium 10 in the optical channel. Light is applied from a source of light 13 through a plurality of beam forming and modifying elements onto the light modulating medium 10. In the electrical channel electrical signals varying in magnitude in accordance with the point by point variation in intensity of each of the three primary color constituents of an image to be projected are applied to the electron beam device 11 modulate the beam thereof in the manner to be more fully described below, to produce deformations in the light modulating medium which modify the light transmitted by the modulating medium in point by point correspondence with the image to be projected. An apertured light mask and projection lens system 14, which may consist of a plurality of lens elements, on the light output side of the light modulating medium function to cooperate with the light modulating medium to control the ligh passed by the optical channel and also to project such light onto a screen 15 thereby reconstituting the light in the form of an image.

More particularly, on the light input side of the light modulating medium 10 are located the source of light 13 consisting of a pair of electrodes 20 and 21 between which is produced white light by the application of voltage therebetween from source 22, an elliptical reflector 25 positioned with the electrodes 20 and 21 located at the adjacent focus thereof, a generally circular filter member 26 having a vertically oriented central portion adapted to pass substantially only the red and blue, or magenta, components of white light and having segments on each side of the central portion adapted to pass only the green component of white light, a first lens plate member 27 of generally circular outline which consists of a plurality of lenticules stacked in a horizontal and vertical array, a second lens plate and input mask member 28 of generally circular outline also having a plurality of lenticules on one face thereof stacked in horizontal and vertical array, and the input mask on the other face thereof. The elliptical reflector 25 is located with respect to the light modulating medium 10 such that the latter appears at the other or remote focus thereof. The central portion of the input mask portion of member 28 includes a plurality of vertically extending slots between which are located a plurality of vertically extending bars. On the segments of the mask on each side of the central portion thereof are located a plurality of horizontally oriented slots or light apertures spaced between similarly oriented parallel opaque bars. The first plate member 27 functions to convert effectively the single arc source 13 into a plurality of such sources corresponding in number to the number of lenticules on the lens plate member 27, and to image the arc source on individual separate elements of the transparent slots in the input mask portion of member 28. Each of the lenticules on the lens plate portion of member 28 images a corresponding lenticule on the first plate member onto the active area of the light modulating medium 10. With the arrangement described efficient utilization is made of light from the source, and also uniform distribution of light is produced on the light modulating medium. The filter member 26 is constituted of the portions indicated such that the red and blue light components from the source 13 register on the vertically extending slots of the input mask member 28, and green light from the source 13 is registered on the horizontal slots of the input mask member 28.

On the light output side of the light modulating medium are located a mask imaging lens system 30 which may consist of a plurality of lens elements, an output mask member 31 and a projection lens system 32. The output mask member 31 has a plurality of parallel vertically extending slots separated by a plurality of parallel vertically extending opaque bars in the central portion thereof. The output mask member 31 also has a plurality of horizontally extending slots separated by a plurality of parallel horizontally extending opaque bars in a pair of segments on each side of the central portion thereof. In the absence of deformations in the light modulating medium 10, the mask lens system 30 images light from each of the slots in the input mask member 28 onto corresponding opaque bars on the output mask member 31. When the light modulating medium 10 is deformed, light is deflected or deviated by the light modulating medium, passes through the slots in the output mask member 31, and is projected by the projection lens system 32 onto the screen 15. The details of the light input optics of the light valve projection system shown in FIGURE 1 are described in the aforementioned copending patent application Ser. No. 316,606, filed Oct. 16, 1963, and assigned to the assignee of the present invention.

The output mask lens system 30 comprises four lens elements which function to image light from the slots in the input mask onto corresponding portions of the output mask in the absence of any physical deformation in the light modulating medium. The projection lens system 32 in combination with the light mask lens system 31 comprises a composite lens system for imaging the light modulating medium on a distant screen on which an image is to be projected. The projection lens system 32 comprises five lens elements. The plurality of lenses are provided in the light mask and projection lens system to correct for the various aberrations in a single lens system. The details of the light mask and projection lens system are described in patent application Ser. No. 336,505, filed Jan. 8, 1964, and assigned to the assignee of the present invention.

According to present day color television standards in force in the United States an image to be projected by a television system is scanned by a light-to-electrical converter horizontally once every $\frac{1}{15735}$ of a second, and vertically at a rate of one field of alternate lines every one-sixtieth of a second. Correspondingly, an electron beam of a light producing or controlling device is caused to move at a horizontal scan frequency of 15,735 cycles per second in synchronism with the scanning of the light converter, and to form thereby images of light varying in intensity in accordance with the brightness of the image to be projected. The pattern of scanning lines, as well as the area of scan, is commonly referred to as the raster.

Figure 2B:
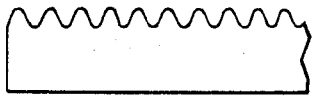

In FIGURE 2A is shown in schematic form a portion of such a raster in the light modulating medium along with the diffraction grating corresponding to the red color component. The size of the raster or whole area scanned in the embodiment is approximately 0.82 of an inch in height, and 1.10 of an inch in width. The horizontal dash lines 33 are the alternate scanning lines of the raster appearing in one of the two fields of a frame. The spaced vertically oriented dotted lines 34 on each of the raster lines, i.e., extending across the raster lines schematically represent concentrations of charge laid down by an electron beam to form the red diffraction grating in a manner to be described hereinafter, such concentrations occurring at equally spaced intervals on each line, corresponding parts of each scanning line having similar concentrations thereby forming a series of lines of charge equally spaced from adjacent lines which cause the formation of valleys in the light modulating medium, the depth of such valleys, of course, depending upon the concentraiton of charge. Such a wave is produced by a signal superimposed on an electron beam moving horizontally at a frequency 15735 cycles per second, a carrier wave, of smaller amplitude but of fixed frequency of the order of 16 megacycles per second thereby producing a line-to-line spacing in the grating of approximately 1/760 of an inch. The high frequency carrier wave causes a velocity modulation of the beam thereby causing the beam to move in steps, and hence to lay down the pattern of charge schematically depicted in this figure with each valley extending in the vertically direction and adjacent valleys being spaced apart by a distance determined by the carrier frequency as shown in greater detail in FIGURE 2B which is a side view of FIGURE 2A.

Figure 2C:
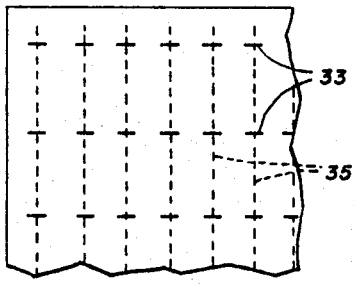
Figure 2D:
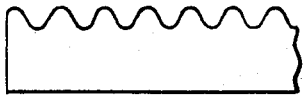

In FIGURE 2C is shown a section of the raster on which a blue diffraction grating has been formed. As in the case of the red diffraction grating, the vertically oriented dotted lines 35 of each of the electron beam scan lines 33 represent concentrations of charge laid down by the electron beam. The grating line to line spacing is uniform, and the amplitude thereof varies in accordance with the amount of charge present. The blue grating is formed in a manner similar to the manner of formation of the red grating, i.e., a carrier frequency of amplitude smaller than the horizontal deflection wave is applied to produce a velocity modulating in the horizontal direction of the electron beam, at that frequency rate, thereby to lay down charges on each line that are uniformly spaced with the line to line spacing being a function of the frequency. A suitable frequency is nominally 12 megacycles per second. In FIGURE 2D is shown a side view of the section of the light modulating medium showing the deformations produced in the medium in response to the aforementioned lines of charge.

Figure 2E:
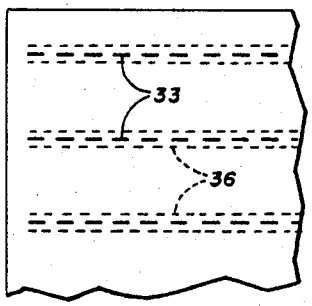
Figure 2F:

In FIGURE 2E is shown a section of the raster of the light modulating medium on which the green diffraction grating has been formed. In this figure are shown the alternate scanning lines 33 of a frame or adjacent lines of a field. On each side of the scanning lines are shown dotted lines 36 schematically representing concentrations of charge extending in the direction of the scanning lines to form a diffraction grating having lines or valleys extending in the horizontal direction. The green diffraction grating is controlled by modulating the electron scanning beam at very high frequency, nominally 48 megacycles in the vertical direction, i.e., perpendicular to the direction of the lines, to produce a uniform spreading out or smearing of the charge transverse to the scanning direction of the beam, the amplitude of the smear in such direction varying proportionately with the amplitude of the high frequency carrier signal, which amplitude varies inversely with the amplitude of the green video signal. The frequency chosen is higher than either the red or blue carrier frequency to avoid the undesired interaction with signals of other frequencies of the system including the video signals and the red and blue carrier waves, as will be more fully explained below. With low modulation of the carrier wave more charge is concentrated in a line along the center of the scanning direction than with high modulation thereby producing a greater deformation in the light modulating medium at that part of the line. In short, the natural grating formed by the focussed beam represents maximum green modulation or light field, and the defocussing by the high frequency modulation deteriorates or smears such grating in accordance with the amplitude of such modulation. For good dark field the grating is virtually wiped out. FIGURE 2F is a sectional view of the light modulating medium of FIGURE 2E showing the manner in which the concentrations of charge along the adjacent lines of a field function to deform the light modulating medium into a series of valleys and peaks representing a phase diffraction grating.

Thus FIGURE 2 depicts the manner in which a single electron beam scanning the raster area in the horizontal direction at spaced vertical intervals may be simultaneously modulated in velocity in the horizontal direction by two amplitude modulated carrier waves, both substantially higher in frequency than the scanning frequency, one substantially higher than the other, to produce a pair of superimposed vertically extending phase diffraction gratings of fixed spacing thereon, and also may be modulated in the vertical direction by an amplitude modulated carrier wave to produce a third grating having lines of fixed line to line spacing extending in the horizontal direction orthogonal to the direction of grating lines of the other two gratings. By amplitude modulating the three beam modulating signals corresponding point by point variations in the depth of the valleys or lines of the diffraction grating are produced. Thus by applying the three signals indicated, each simultaneously varying in amplitude in accordance with the intensity of a respective primary color component of the image to be projected, three primary diffraction gratings are formed, the point by point amplitude of which vary with the intensity of a respective color component.

As used in this specification with reference to the specific raster area of the light modulating medium, a point represents an area of the order of several square mils and corresponds to a picture element. For the faithful reproduction or rendition of a color picture element three characteristics of light in respect to the element need to be reproduced, namely, luminance, hue, and saturation. Luminance is brightness, hue is color, and saturation is fullness of the color. It has been found that in general a system such as the kind under consideration herein that one grating line is adequate to function for proper control of the luminance characteristic of a picture element in the projected image and that about three to four lines are a minimum for the proper control of hue and saturation characteristics of a picture element.

Phase diffraction gratings have the property of deviating light incident thereon, the angular extent of the deviation being a function of the line to line spacing of the grating and also of the wavelength of light. For a particular wavelength a large line to line spacing would produce less deviation than a small line to line spacing. Also for a particular line to line spacing short wavelengths of light are deviated less than long wavelengths of light. Phase diffraction gratings also have the property of transmitting deviated light in varying amplitude in response to the amplitude or depth of the lines or valleys of the grating. Accordingly it is seen that the phase diffraction grating is useful for the point by point control of the intensity of the color components in a beam of light. The line to line spacing of a grating controls the deviation, and hence color component selection, and the amplitude of the grating controls the intensity of such component. By the selection of the spacing of the blue and red grating, in a red, blue, and green primary system, for example, such that the spacing of the blue grating is sufficiently smaller in magnitude than the red grating so as to produce the same deviation in first order light as the deviation of the red component by the red grating, the deviation of the red and blue components can be made the same. Thus the red and blue components can be passed through the same apertures in an output mask and the relative magnitude of the red and blue light would vary in accordance with the amplitude of the gratings. Such a system is described and claimed in U.S. Patent No. Re. 25,169, W. E. Glenn, Jr., assigned to the same assignee as the present invention.

When a pair of phase diffraction gratings such as those described are simultaneously formed and superimposed in a light modulating medium, inherently another diffraction grating, referred to as the beat frequency grating, is formed which has a spacing greater than either of the other two gratings, if the beat frequency itself is lower than the frequency of either of the other two gratings. The effect of such a grating, as is apparent from the considerations outlined above, is to deviate red and blue light incident thereon less than is deviated by the other two gratings and hence such light is blocked by the output mask having apertures set up on the basis of considerations outlined in the previous paragraph. Such blockage represents impairment of proper color rendition as well as loss of useful light. One way to avoid such effects in a two color component system is to provide diffraction gratings which have lines or valleys extending orthogonal to one another. Such an arrangement is disclosed and claimed in U.S. Patent 3,078,338, W. E. Glenn, Jr., assigned to the assignee of the present invention. However, when it is desired to provide three diffraction gratings superimposed on a light modulating medium for the purpose of modulating simultaneously point by point the relative intensity of each of three primary color components in a beam of light, inevitably two of the phase gratings must be formed in a manner to have lines or valleys, or components thereof, extending in the same direction. The manner in which such effects can be avoided are described and claimed in the aforementioned copending patent application, Ser. No. 343,990, filed Feb. 11, 1964, and assigned to the assignee of the present invention.

Referring again to FIGURE 1, an electron writing system is provided for producing the phase diffraction gratings in the light modulating medium, and comprises an evacuated enclosure 40 in which are included an electron beam device 11 having a cathode (not shown), a control electrode (not shown), and a first anode (not shown), a pair of vertical deflection plates 41, a pair of horizontal deflection plates 42, a set of vertical focus and deflection electrodes 43, a set of horizontal focus and deflection electrodes 44, and the light modulating medium 10. The cathode, control electrode, and first anode along with the transparent target electrode 48 supporting the light modulating medium 10 are energized from a source 46 to produce in the evacuated enclosure an electron beam that at that point of focussing on the light modulating medium is of small dimensions (of the order of a mil), and of low current (a few microamperes), and high voltage. Electrodes 41 and 42, connected to ground through respective high impedances 68a, 68b, 68c, and 68d provide a deflection and focus function, but are less sensitive to applied deflection voltages than electrodes 43 and 44. The electrodes 43 and 44 control both the focus and deflection of the electron beam in the light modulating medium in a manner to be more fully explained below.

A pair of carrier waves which produce the red and blue gratings, in addition to the horizontal deflection voltage are applied to the horizontal deflection plates 42. The electron beam, as previously mentioned, is deflected in steps separated by distances in the light modulating medium which are a function of the grating spacing of the desired red and blue diffraction gratings. The period of hesitation at each step is a function of the amplitude of the applied signal corresponding to the red and blue video signals. A high frequency carrier wave modulated by the green video signal, in addition to the vertical sweep voltage, is applied to the vertical deflection plates 41 to spread the beam out in accordance with the amplitude of the green video signal as explained above. The light modulating medium 10 is an oil of appropriate viscosity and of deformation decay characteristics on a transparent support member 45 coated with a transparent conductive layer adjacent the oil such as indium oxide. The electrical conductivity and viscosity of the light modulating medium is so constituted so that the amplitude of the diffraction gratings decay to a small value after each field of scan thereby permitting alternate variations in amplitude of the diffraction grating at the sixty cycle per second field scanning rate. The viscosity and other properties of the light modulating medium are selected such that the deposited charges produce the desired deformations in the surface. The conductive layer is maintained at ground potential and constitutes the target electrode for the electron writing system. Of course, in accordance with television practice the control electrode is also energized after each horizontal and vertical scan of the electron beam by a blanking signal obtained from a conventional blanking circuit (not shown).

Above the evacuated enclosure 40 are shown in functional blocks the source of the horizontal deflection and beam modulating voltages which are applied to the horizontal deflection plates to produce the desired horizontal deflection. This portion of the system comprises a source of red video signal 50, and a source of blue video signal 51 each corresponding, respectively, to the intensity of the respective primary color component in a television image to be projected. The red video signal from the source 50 and a carrier wave from the red grating frequency source 52 are applied to the red modulator 53 which produces an output in which the carrier wave is modulated by the red video signal. Similarly, the blue video signal from source 51 and carrier wave from the blue grating frequency source 54 is applied to the blue modulator 55 which develops an output in which the blue video signal amplitude modulates the carrier wave. Each of the amplitude modulated red and blue carrier waves are applied to an adder 56 the output of which is applied to a push-pull amplifier 57. The output of the amplifier 57 is applied to the horizontal plates 44. The output of the horizontal deflection saw-tooth source 58 is also applied to plates 44 and to plates 42 through capacitors 49a and 49b.

Below the evacuated enclosure 40 are shown in block form the circuits of the vertical deflection and beam modulation voltages which are applied to the vertical deflection plates to produce the desired vertical deflection. This portion of the system comprises a source of green video signal 60, a green grating or wobbulating frequency source 61 providing high frequency carrier energy, and a modulator 62 to which the green video signal and carrier signal are applied. An output wave is obtained from the modulator having a carrier frequency equal to the carrier frequency of the green grating frequency source and an amplitude varying inversely with the amplitude of the green video signal. The modulated carrier wave and the output from the vertical deflection source 63 are applied to a conventional push-pull amplifier 64, the output of which is applied to vertical plates 43 to produce deflection of the electron beam in the manner previously indicated. The output of the vertical deflection sawtooth source 63 is also applied to the plates 43 and to plates 41 through capacitors 49c and 49d.

A circuit for accomplishing the deflection and focusing functions described above in conjunction with the deflection and focusing electrode system comprising two sets of four electrodes such as shown in FIGURE 1 is shown and described in a copending patent application Ser. No. 335,117, filed Jan. 2, 1964, and assigned to the assignee of the present invention. An alternative electrode system and associated circuit for accomplishing the deflection and focusing function is described in the aforementioned copending patent application, Ser. No. 343,990.

As mentioned above the red and blue channels make use of the vertical slots and bars and the green channel makes use of the horizontal slots and bars. The width of the slots and bars, in one arrangement or array is one set of values and the width of the slots and bars in the other arrangement is another set of values. The raster area of the modulating medium may be rectangular in shape and has a ratio of height to width or aspect ratio of three to four in accordance with television standards in force in the United States. The center-to-center spacing of slots in the horizontal array is made three-fourths the center-to-center spacing of the slots in the vertical array. Each of the lenticules in each of the lenticular plates are also so proportioned, i.e., with height to width ratio of three to four. The lenticules in each plate are stacked into horizontal rows and vertical columns. Each of the lenticules in one plate are of one focal length and each of the lenticules on the other plate are of another focal length. The filter element may be constituted to have three sections registering light of red and blue color components in the central portion of the input mask and green light in the side sector portions as will be apparent from considering FIGURE 3.

Figure 3:
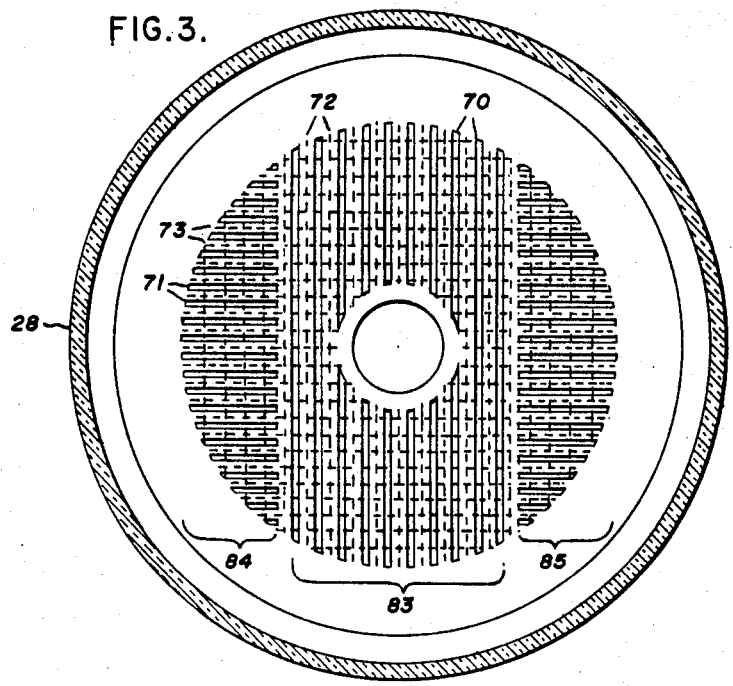
FIGURE 3 is an end view taken along section 3—3 of the system of FIGURE 1 showing the second lenticular lens plate and the input mask thereof.

In FIGURE 3 is shown a view of the face of the second lenticular lens plate and input mask 28 as seen from the raster area of the modulating medium or along section 3—3 of FIGURE 1. In this figure the vertical oriented slots 70 are utilized in the controlling of the red and blue light color components in the image to be projected. The horizontally extending slots 71 located in the sector area in the input mask on each side of the central portion thereof function to cooperate with the light modulating medium and light output mask to control the green color component in the image to be projected. The ratio of the center-to-center spacing of the horizontal slots 71 to the center-to-center spacing of the vertical slots 70 is three-fourths. The rectangular areas enclosed by the vertical and horizontal dash lines 72 and 73 are the boundaries for the individual lenticules appearing on the opposite face of the plate 28. The focal length of each of the lenticules is the same. The center of each of the lenticules lies in the center of an element of a corresponding slot.

Figure 4:
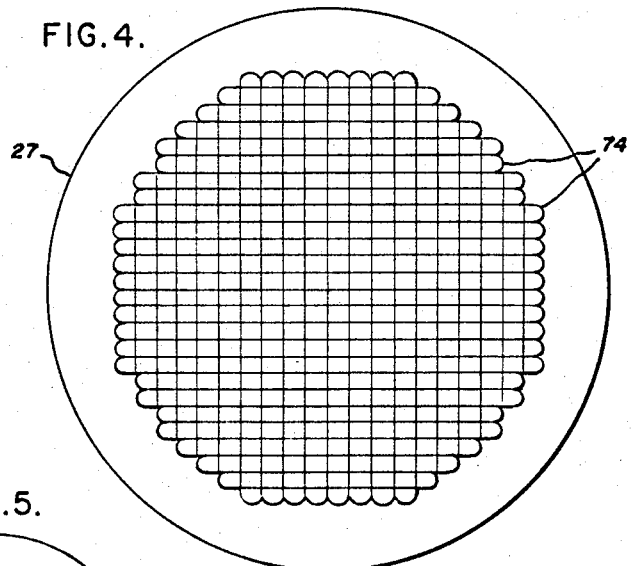
FIGURE 4 is an end view taken along section 4—4 of FIGURE 1 showing the first lenticular lens plate thereof.

FIGURE 4 shows the first lenticular lens plate 27 taken along section 4—4 of FIGURE 1 with horizontal rows and vertical columns of lenticules 74. Each of the lenticules of this plate cooperates with a correspondingly positioned lenticule on the second lenticular lens plate shown in FIGURE 3 in the manner described above. Each of the lenticules on plate 27 have the same focal length which is different from the focal length of the lenticules on the second lenticular plate 28.

Figure 5:
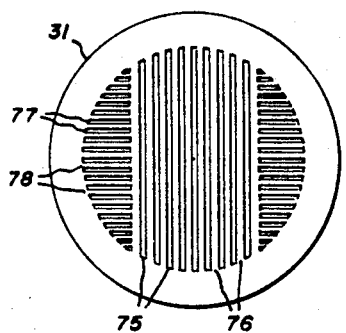
FIGURE 5 is an end view taken along section 5—5 of the system of FIGURE 1 showing the light output mask thereof.

FIGURE 5 shows the light output mask 31 of FIGURE 1 taken along section 5—5 thereof. This mask consists of a plurality of transparent slots 75 and opaque bars 76 in a central vertically extending section of the mask and a plurality of transparent slots 77 and opaque bars 78 in each of two sectors of the spherical mask lying on each side of the central portion thereof. As mentioned previously the slots and bars from the output mask are in a predetermined relationship to the slots and bars of the input mask.

Figure 6:
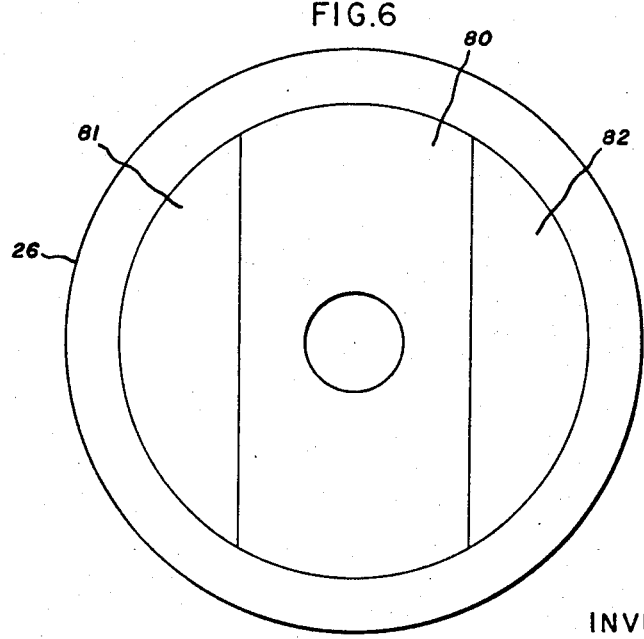
FIGURE 6 is an end view taken along section 6—6 of the system of FIGURE 1 showing the light filter plate thereof.

Referring now to FIGURE 6 of the drawing there is shown filter element 26. The filter element 26 is a circular plate and is composed of a central and vertically extending section 80, symmetrical about the vertical axis of the circular plate, and a segment 81 on one side and a segment 82 on the other side of the central section and symmetrically disposed with respect thereto. The central section 80 is constituted to pass red and blue, or magenta, light of the desired wavelengths and to reject from further utilization in the system all other wavelengths of light including green light. Each of the segments 81 and 82 are constituted to pass green light of the desired wavelengths and to reject all other light from further utilization in the system. The filter sections will be described in more detail below in connection with FIGURES 8 and 9. The filter may be constituted of physically individual sections or they may be integrally formed on a circular plate or in the alternative and preferably may be formed integral with one of the elements of the input portion of the system, for example, on the first lenticular plate. When the filter elements are formed in physically separate sections the desired transmission characteristics of each of the sections may be obtained by the utilization of suitable glasses and introduction of impurities therein in a manner known to those skilled in the art, or in the alternative may be formed by the deposition on the appropriate surface thereof of suitable materials which have the desired light transmission and rejection characteristics.

Figure 7:
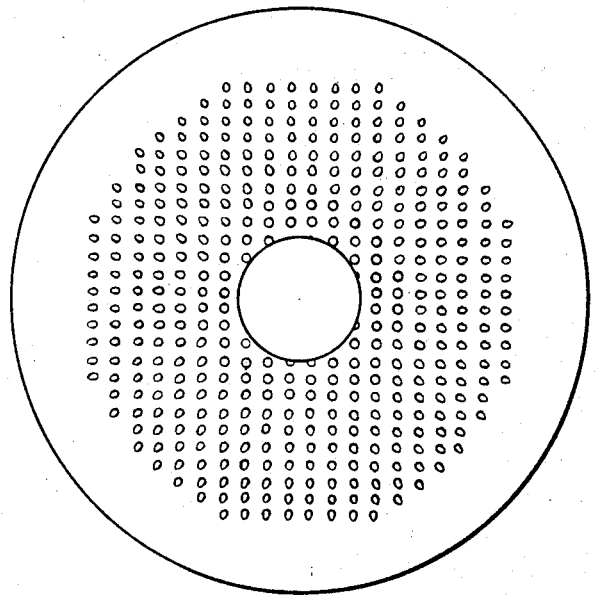
FIGURE 7 shows the surface of the input light mask and the cross sections of the beams of light from the lenticular plates incident thereon.

The light source 13 of FIGURE 1 is of the high light intensity arc type and is of elongated configuration. An ellipsoidal reflector 25 is utilized to obtain maximum light from such a source. The light source 13 is arranged on the major axis of the ellipsoid such that the major axis of the light source is coincident therewith, and further the light source is placed at the focus of such ellipsoid adjacent the surface of the reflector 25. The light modulating medium 10 is arranged essentially at the other focus of the reflector 25. With such an arrangement maximum light from the elongated light source is directed onto the light modulating medium, as desired. In the system of FIGURE 1 to further effect maximum illumination of the light modulating medium through the light mask a pair of lenticular plates 27 and 28 are provided and function in the manner explained above. With such an arrangement of components in the input portion of the optical system of the apparatus of FIGURE 1, the light appearing at the surface of the input light mask located on plate 28 is of the form shown in FIGURE 7. It is readily apparent that the beams of light from the source 13 reflected close to the major axis of the reflector 25 are essentially circular in cross-section outline. The beams of light reflected from areas of the reflector progressively more distant from the major axis take on an elongated shape, one end of which is round and the other end of which is substantially pointed, i.e., tear drop. Such effect is due in major part to the elongated source 13 and the reflector. The major axes of the cross-sections of the spots of light are radially aligned. In accordance with one aspect of the invention the composition of area of the mask on which the various groups of slots are located as well as the orientation of the slots therein is so arranged as to permit optimum passage of such beams of light therethrough to provide maximum light efficiency in the system. Superposition of the beams of light represented by FIGURE 7 on the input mask of FIGURE 3 will readily reveal the relationship of the light pattern produced by the input portion of the optical system to the slots of the mask. The mask is of circular outline and is divided into three sections similar to the sections of the filter plate of FIGURE 6, including a central and vertically extending section 83 symmetrical about the vertical axis of the circular plate, and a segment 84 on one side and a segment 85 on the other side of the central section and symmetrically disposed with respect thereto. The slots in the central section 83 are vertically oriented. The slots in each of the horizontally disposed segments 84 and 85 are horizontally oriented. With such an arrangement the slots of the mask have essentially an orientation which in terms of transparency is close to radial, and allows maximum light to pass therethrough. Such an arrangement is much better than if the slots in the central section 83 were horizontally oriented and the slots in the side segments 84 and 85 were vertically oriented, or in the alternative than if the segments 84 and 85 were located at the top and bottom instead of one side and the other side of the plate, and correspondingly the slots in such segments were horizontal and the slots in the now horizontally extending central section were vertical. Of course, similar sections and slot orientations are provided in the output mask 31 of FIGURE 5.

Because of the substantially greater axial length of the optics of the mask lens projection system 30 and the projection lens system 32 of FIGURE 1 in relation to the diameter thereof, off-axis light is progressively blocked at progressively greater off-axis origins of said light. Accordingly, were the system arranged such that light of one color were to be passed through one side of a filter and an input mask and light of another color passed through the other side of the filter and input mask, the resultant projected image would have gradations in color in which the projected side corresponding to the one side would have high intensity of said one color and weak intensity of the other color and vice versa, in other words vignetting would occur. Of course, with two lens systems in series and of comparable effect, the color vignetting of one system can be compensated by the other system. The arrangement of the light mask and the filter with the central sections of these elements passing a pair of colors and the symmetrically deposed horizontal side sections passing the other color, better balance of vignetting in the horizontal direction is achieved where vignetting would be more noticeable in view of the three to four aspect ratio of the projected image. Further, utilization of a light source and collection system in which the light is channeled into a circular aperture, and in which the filter and the input mask apertures are circular provides an efficient way of channeling such light into the spherical lens systems of the apparatus which are of circular outline.

In the system of FIGURE 1 the lines of the gratings on the light modulating medium 10 corresponding to two of the colors, namely the red and blue, are parallel. The line to line spacing of the red grating and the line to line spacing of the blue grating are different and are precisely set. The difference in spacing in cooperation with a single set of output slots on output mask of FIGURE 5 is utilized in the sparation of these colors. Accordingly, such line to line spacing for each of the gratings must be maintained for all the individual beams of light emerging from the input mask. If such is not the case, contamination of the red and blue colors in the projected image results. The beams which are off-axis see different line to line spacings than do the beams essentially on axis. Such foreshorting of line to line spacing can be kept to a minimum by arranging the slots of the red and blue input channel vertically along the central section and assigning the slots in the side sections to the single color channel, namely green, in which the grating lines and the corresponding slots in the output mask are not utilized in color selection.

The light mask projection lens system 30 inherently has certain aberrations. The use of compound lens systems such as lens system 30 minimizes such aberrations. Inherently the aberration known as lateral color, i.e., different magnifications for different colors in the lateral direction, and coma are more in the radial direction than orthogonal thereto. Accordingly, a generally radial alignment of slots associated with the magenta channel makes possible use of larger slots with resultant increased light efficiency.

Figure 8:
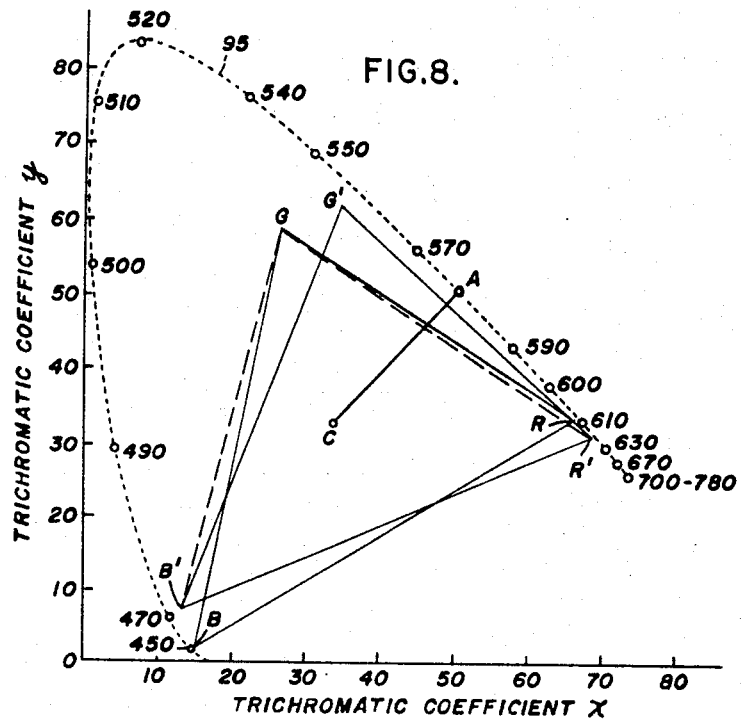
FIGURE 8 is a color mixture diagram according to the 1931 C.I.E. Standard Observer on which is shown a pair of color triangles useful in explaining the present invention.

Referring now to FIGURE 8 there is shown a color mixture diagram according to the 1931 C.I.E. Standard Observer which will be useful in explaining one aspect of the invention. The trichromatic coefficient $x$ is plotted along the abscissa, and the trichromatic coefficient $y$ is plotted along the ordinate. The dotted graph 95 is the locus of fully saturated spectrum colors. The point C, referred to as the white point, represents a standard illuminant or source of white light. All colors that could be obtained or matched by a mixture of white light and the spectrum color A, for example, are represented by points on the line CA. If the proportion of white light is large the representative point of mixture lies close to the white point. As the proportion of the spectrum color A in the mixture is increased the representative point moves closer to the spectrum locus 95 and the color approaches a pure spectrum color. Quantitively the purity of any color is defined as the distance of its representative point from the white point C expressed as a percent of the distance from the white point to the spectrum locus 95 along a straight line from the white point passing through the given point. The dominant wavelength of a given color is the wavelength at which a line from the white point passing through the point representing the color intersects the spectrum locus 95. The characteristics of dominant wavelength and purity taken together constitute the chromaticity of a given color. The specification of color in terms of dominant wavelength and purity enables the appearance of color to be visualized more readily than its description in terms of trichromatic coefficients or in terms of tristimulus values on which the trichromatic coefficients are based. Dominant wavelength is equivalent to hue, and purity is equivalent to saturation.

As mentioned above, the chromaticity characteristics of hue and saturation along with brightness enables the visual properties of light to be accurately specified. In any color television projection system it is important to render the individual primary colors of red, blue, and green faithfully, and also to provide a sufficiently all-inclusive range of color renditions to provide a faithful reproduction of color images. If the individual primary colors can be faithfully rendered, inherently, combinations of them can also be faithfully rendered. In prior art systems all of the light originating from a light source was initially utilized in the projection of color images. Initially, for example, a dominant green wavelength such as corresponds to point G on the diagram was selected. The dominant wavelength and purity represented by that point was obtained by a band pass filter, which allowed the green wavelengths from 475 millimicrons to 585 millimicrons to be passed and reflected the light energy below and above this band of energies. Such light was then utilized to produce the blue and red primaries. The lower in wavelength band of such light energy corresponded to the blue color represented by B, and the upper in wavelength band of light energy corresponds to the red color represented by R. Such blue color is much too deep, and such red color is much too orangish, and consequently would not produce a true and faithful rendition of color images. Of course, such a system would be able to produce colors corresponding to points which lie within the triangle formed by straight lines between the three points G, B, and R. If, conversely, a magenta dichroic filter is provided which passes light from the lower end of the visual spectrum, say from 395 millimicrons to 505 millimicrons, rejects light in the range from 505 millimicrons to 595 millimicrons, and passes light from 595 millimicrons to 700 millimicrons, the resultant dominant blue wavelength is represented by point B' and the resultant dominant red wavelength is represented by point R'. Such blue is less deep than the blue of the preceding example, and the red is deeper than the red of the previous example, both much more satisfactory for faithful rendition of color images. However, the green light reflected by the magenta dichroic filter now produces a green, the dominant wavelength and purity of which is represented by point G' which is much too yellowish and saturated for use in a three color primary additive system, and hence unsatisfactory.

In accordance with the present invention a green filter represented by segments 81 and 82 of the filter plate 26 of FIGURE 6 is utilized which enables the hue and saturation of the green point to be set as desired, namely point G, and a magenta filter represented by central section 80 of filter plate 81 of FIGURE 6 is utilized which enables the hue and saturation of the blue and red point to be set as desired, namely B' and R'. Any light falling on the green filter and not passed by the green filter is rejected from further use in the system, and similarly any light falling on the magenta filter and not passed by the magenta filter is rejected from further use in the system.

Figure 9:
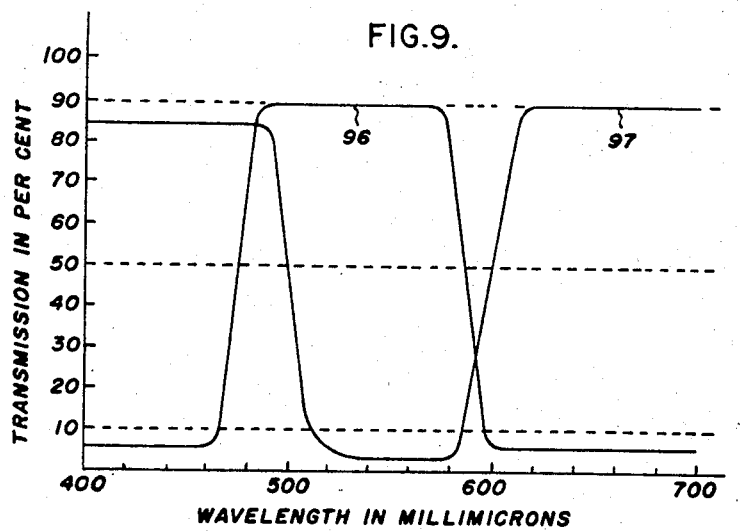
FIGURE 9 is a diagram of the light transmission characteristics of sections of the light filter plate of FIGURE 6.

The transmission characteristics of these filters are shown in FIGURE 9 in which the ordinate represents percent of transmission, and the abscissa represents the wavelength of light in millimicrons. It will be noted that the transmission characteristic of the green filter, segments 81 and 82, represented by graph 96 has less than 10% transmission up to about 475 millimicrons at which point the transmission rises very rapidly to about 90% at 490 millimicrons. Such transmission is maintained to 580 millimicrons at which point transmission sharply drops to less than 10% at 600 millimicrons. The red and blue, or magenta filter, central section 80, represented by graph 97 has approximately 85% transmission in the lower end of the visual spectrum up to about 490 millimicrons at which point the transmission drops rapidly to less than 10% at 510 millimicrons. Such low transmission is maintained to 590 millimicrons at which point the transmission rapidly rises to approximately 90% transmission at 610 millimicrons. It should be noted from the superimposed graphs of transmission characteristics of the green and magenta filters that both filters transmit a common band of wavelengths approximately in the range of 480 millimicrons to 500 at the 50% transmission point. Also it should be noted that both filters reject a band of wavelengths approximately in the range of 585 to 600 millimicrons at the 50% transmission point. Filters so constituted provide the system with primary color components represented by point G of the first described color triangle of FIGURE 8 and point B' and R' of the second described triangle of FIGURE 8 as desired for complete and faithful rendition of color images. Such a result could have been achieved partly in prior type dichroic filter arrangements such as described above in which total light from a source is utilized in subsequent portions of the projector. The elimination of some light in the range of 585 to 600 millimicrons, however, would have entailed use of additional filter elements to provide the system with the desired separation of red and blue primary colors. But even then a compromise has to be made in the separation of blue and green, resulting in a somewhat too deep blue and a green that is more yellow than desired. The present invention achieves better results with a small number of elements and in a simple arrangement. In effect, in accordance with the present invention the magneta filter and the green filter both use the cyan part of the white spectrum and both exclude a certain part of the yellow spectrum. In addition to the use of simple geometry and to the use of a minimum components, the particular arrangement using circular contour in the filter elements enables the light emerging from the filters to properly fill the mask and projection lens systems and keeps vignetting in the raster area within acceptable limits.

While the filter member 26 in the system of FIGURE 1 has been shown situated between the light source 13 and the first lens plate 27, it will be appreciated that such a filter element may be located in axial positions between the light source and the screen 15 where the magenta and green light occupy discrete or reasonably well defined areas in a surface transverse to the axis. At such positions the central section 80 of the filter member which passes magenta component and rejects the green component, and the side segments 81 and 82 which pass the green component and reject the magenta component would be optically registered so that the light associated with the central sections of the mask members 28 and 31 would impinge on the central section of the filter member, and so that the light associated with the side segments of the masks would impinge on the side sections of the filter member. A particularly advantageous location for such a filter member is at or in the vicinity of the location of the light output mask 31. As the light output mask is substantially smaller than the light input mask such filter element could be made of substantially smaller size than the filter member shown in FIGURES 1 and 7 with resultant reduced cost. In the event that the output mask is formed by depositing an opaque coating on a transparent member, the filter element may be formed on the other opposed surface of such member thereby eliminating the need for a separate member for the filter. Of course, the filter member of FIGURE 1 could also be similarly formed on one of the surfaces of the first lens plate 27 or the second lens plate 28. The concave surfaces, i.e., the surfaces remote from the light source 13 of lens plates 27 and 28 would be especially suitable for the location of filter coatings.

What we claim as new and desire to secure by Letters Patent of the United States is:

1. In apparatus for projecting a color image corresponding to deformations contained in a light modulating medium in the form of three superimposed light diffraction gratings, a first grating having lines extending in one direction and second and third gratings having lines extending in another direction orthogonal to said one direction, the deformations of said first grating having an amplitude dependent upon the intensity of a first color component, the deformations of said second grating having an amplitude dependent upon the intensity of a second color component and the deformations of a third diffraction grating having an amplitude dependent upon the intensity of a third color component, the line to line spacing of said second diffraction grating being different from the line to line spacing of said third diffraction grating, the combination of:

a source of light for producing said three color components of light, a first light mask including a first and a second set of opaque bars and transparent slots, the bars and slots of one set extending in said one direction and the bars and slots of said other set extending in said other direction, said first light mask interposed between said source and said light modulating medium, said first set of opaque bars and transparent slots contained in one area of said mask and said second set of bars and slots contained in the remaining area of said mask, a filter having one area transmitting light of said first color component and rejecting the remaining light of said source and another area transmitting light of said second and third components and rejecting the remaining light of said source and interposed between said source and said mask, both areas of said filter transmitting a common portion of the cyan band and rejecting a common portion of the yellow band of wavelengths of light from said source, a second light mask including a first and second set of opaque bars and transparent slots, the bars and slots of each set extending respectively in said one and said other directions and disposed in the path of light coming from said light modulating medium, said first set of opaque bars and transparent slots contained in one area of said second light mask and said second set of opaque bars and transparent slots contained in the remaining area of said second mask, said one area of said filter and of said light masks being similar and said remaining area of said filter and of said light masks being similar, means for imaging light from said source through said one area of said filter onto said one area of said first mask and for imaging light from said source through said remaining area of said filter onto said remaining area of said first mask, a projection means for projecting light from the transparent portion of said first light mask onto the corresponding opaque portions of said second light mask in the absence of any deformations in said medium, another projection means for projecting an image of said medium onto a screen, said first and second light masks constituted and positioned with respect to said orthogonally arranged diffraction gratings of said light modulating medium to control conjointly therewith the intensity of each of said three color components projected by said other projection means.

References Cited
UNITED STATES PATENTS

| | | | |
|---|---|---|---|
| 3,272,917 | 9/1966 | Good et al. | 350—161 |
| 3,305,629 | 2/1967 | True | 350—161 |
| 3,330,908 | 7/1967 | Good et al. | 350—161 |

RONALD L. WIBERT, *Primary Examiner.*

V. P. McGRAW, *Assistant Examiner.*

U.S. Cl. X.R.

178—5.4